United States Patent
Lo

(12) 
(10) Patent No.: US 6,486,775 B1
(45) Date of Patent: Nov. 26, 2002

(54) VEHICLE DECELERATION COMMUNICATION SYSTEM

(76) Inventor: Wen Chi Lo, PO Box 82-144, Taipei (TW)

( * ) Notice: Subject to any disclaimer, the term of this patent is extended or adjusted under 35 U.S.C. 154(b) by 0 days.

(21) Appl. No.: 09/904,538

(22) Filed: Jul. 16, 2001

(51) Int. Cl.[7] .................................................. B60Q 1/50
(52) U.S. Cl. ...................................... 340/467; 340/479
(58) Field of Search ................................ 340/467, 464, 340/479, 463, 435, 903

(56) References Cited

U.S. PATENT DOCUMENTS

| | | | | |
|---|---|---|---|---|
| 4,107,647 A | * | 8/1978 | Yoshino | 340/669 |
| 4,959,634 A | * | 9/1990 | Miller | 340/467 |
| 5,717,377 A | * | 2/1998 | Gao | 340/467 |
| 5,838,259 A | * | 11/1998 | Tonkin | 340/903 |

* cited by examiner

*Primary Examiner*—Brent A. Swarthout
(74) *Attorney, Agent, or Firm*—Leong C. Lei

(57) ABSTRACT

A vehicle deceleration communication system includes a deceleration detecting sensor mounted on a decelerating device for detecting deceleration action performed by a driver in traveling so as to send out a deceleration signal, a deceleration signal emission displaying device activated by the deceleration signal from the deceleration detecting sensor, the deceleration signal emission displaying device comprising a deceleration signal emitter mounted at a rear end of a car and a deceleration display to alert a trailing car driver to deceleration of the car, and a deceleration signal reception displaying device comprising a deceleration signal receiver mounted at a front end of the car and a receiving signal display which will flash and/or send out warning sounds to alert the trailing driver to the deceleration of the front car.

1 Claim, 4 Drawing Sheets

VEHICLE DECELERATION COMMUNICATION SYSTEM

BACKGROUND OF THE INVENTION

1. Field of the Invention

The present invention relates a vehicle deceleration communication system and in particular to one which will send out a warning to alert a trailing vehicle driver to the deceleration of the front vehicle whereby the trailing vehicle driver will know whether the car in front of him is decelerating or preparing to apply brakes.

2. Description of the Prior Art

It has been found that rear and vehicular collisions are one of the most common accidents occurring on our road systems today and result in countless loss of money, time and sometimes, life to those involved. Hence, the addition of a third eye-level brake light in the rear window of presently manufactured automobiles has been proposed, which has, no doubt, helped to reduce the number and severity of rear end collisions. Nevertheless, a reliable and more efficient system to alert a trailing vehicle operator that the lead vehicle is, or may be, decelerating prior to actual illumination of the vehicle brake lights could prove a valuable safety device that could further reduce the number and severity of rear end collisions now occurring.

Therefore, it is an object of the present invention to provide a vehicle deceleration communication system which will send out a warning to alert a trailing vehicle driver to the deceleration of the front vehicle.

SUMMARY OF THE INVENTION

The present invention relates a vehicle deceleration communication system

It is the primary object of the present invention to provide a vehicle deceleration communication system which will send out a warning to alert a trailing vehicle driver to the deceleration of the front vehicle.

It is another object of the present invention to provide a vehicle deceleration communication system which enables the trailing vehicle driver to know whether the car in front of him is decelerating or preparing to apply a brake.

It is still another object of the present invention to provide a vehicle deceleration communication system which will send out a waning signal to alert the trailing vehicle driver to the deceleration of the front vehicle even if the visibility is poor.

It is still another object of the present invention to provide a vehicle deceleration communication system which can be easily installed in a car or built in a car when the car is manufactured.

It is a further object of the present invention to provide a vehicle deceleration communication system which will reduce rear-end collision incidence and severity.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

Figure 2:
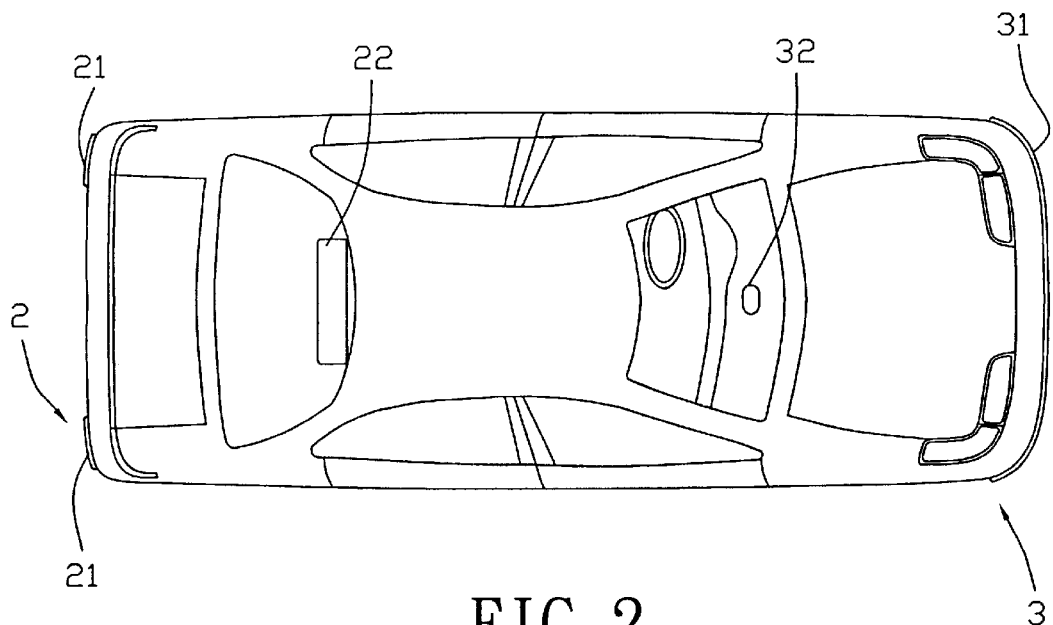
FIG. 2 is a top plan view of FIG. 1.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Figure 1:
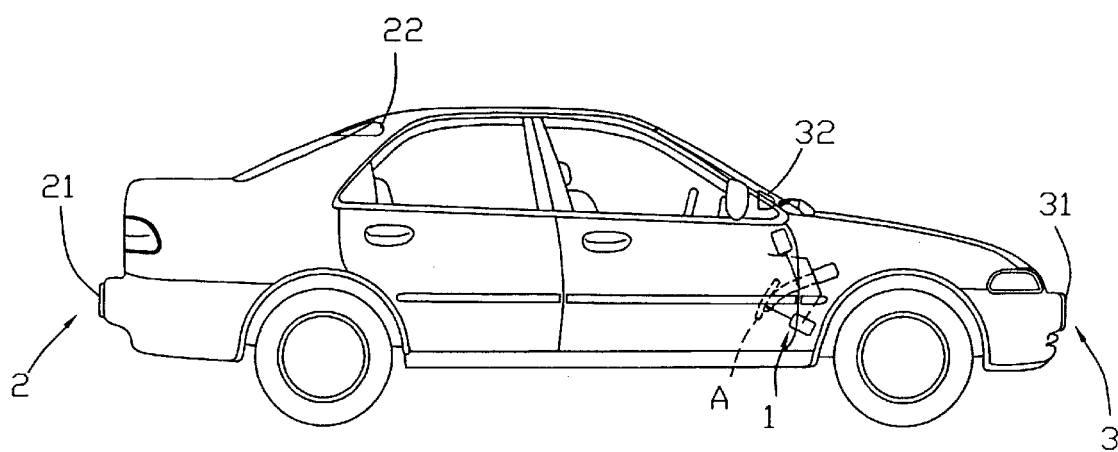
FIG. 1 illustrates a car provided with a vehicle deceleration communication system according to the present invention.
Figure 3:
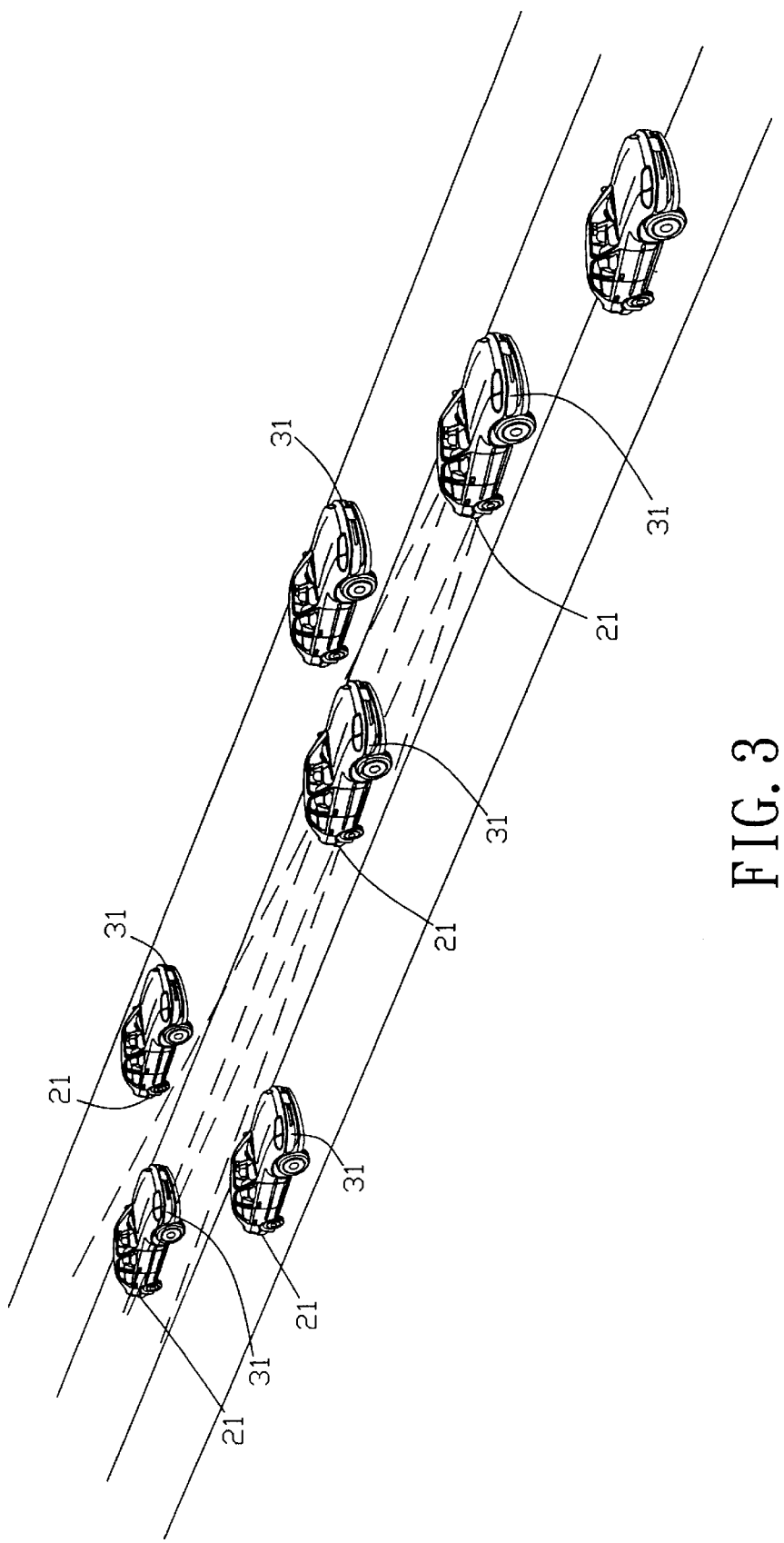
FIG. 3 is a perspective view illustrating the working principle of the present invention.
Figure 4:
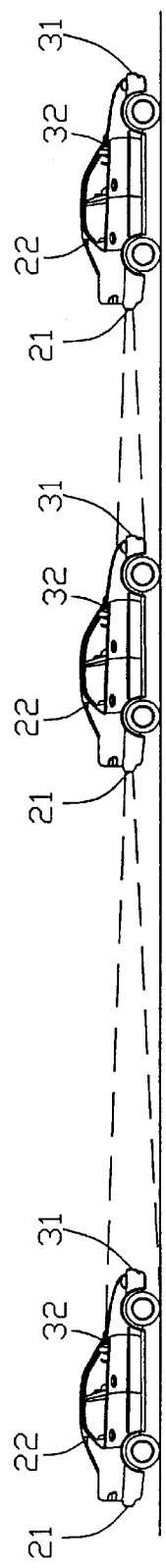
FIG. 4 is a side view illustrating the working principle of the present invention.
Figure 5:
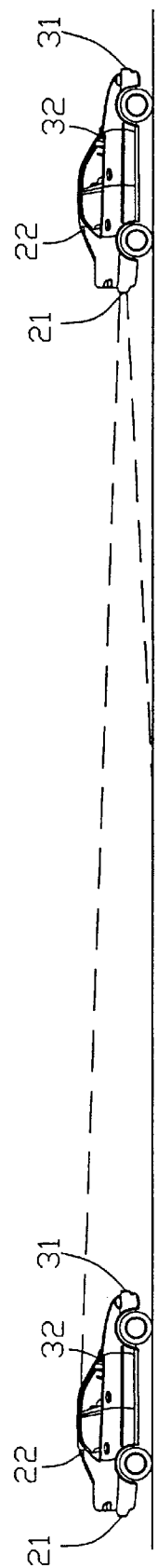
FIG. 5 is another side view illustrating the working principle of the present invention.
Figure 6:
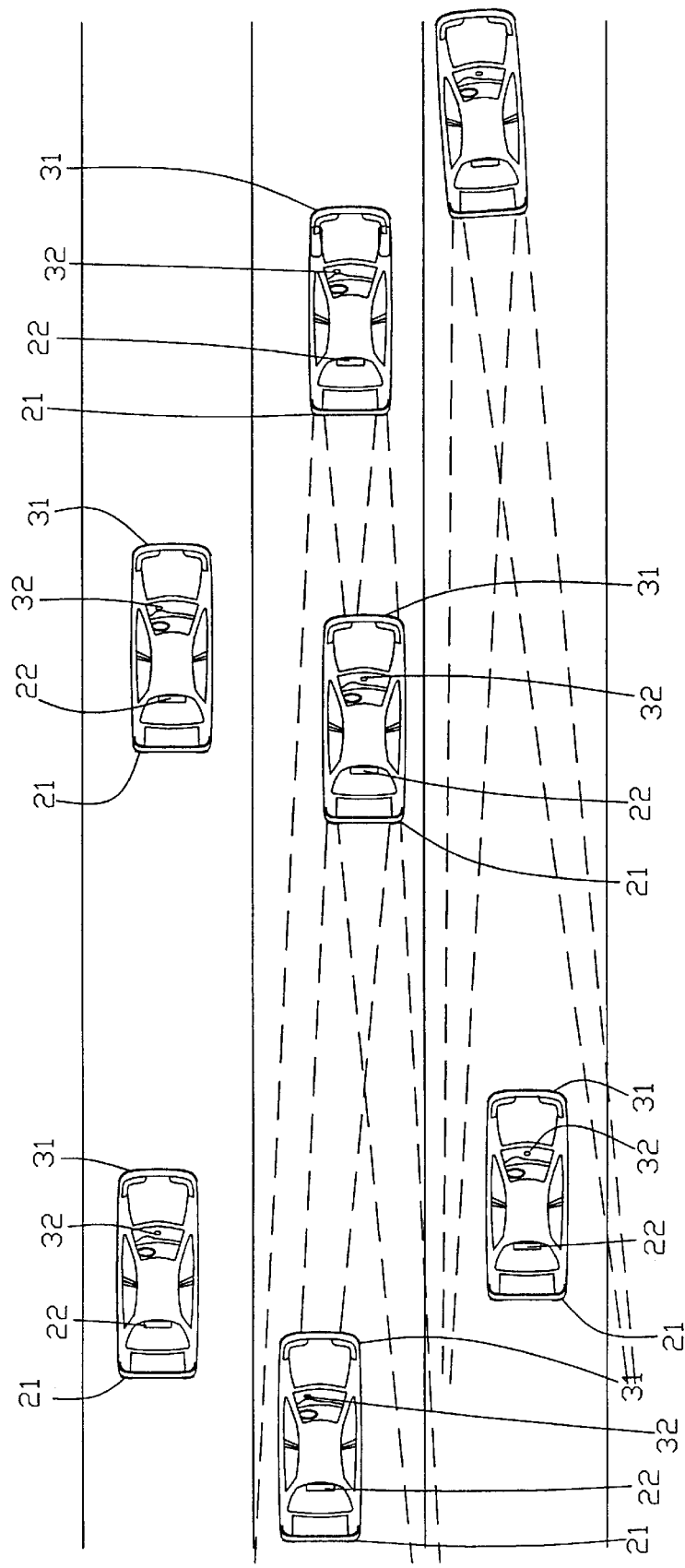
FIG. 6 is a top view illustrating the working principle of the present Invention.

Referring to FIGS. 1 and 2, the present invention generally comprises a deceleration detecting sensor 1, a deceleration signal emission displaying device 2, and a deceleration signal reception displaying device 3.

As shown, the deceleration detecting sensor 1 is mounted adjacent an acceleration pedal A or installed beside a combustion system, and connected thereot via a pushing mechanism, a pulling mechanism, a moving mechanism, a lever mechanism, or a flow control mechanism As the driver releases the acceleration pedal A to slow down the car, the deceleration detecting sensor 1 will be activated to send out a signal to a deceleration signal emitter 21 of the deceleration signal emission displaying device 2 installed at the rear end of the car, and a deceleration display 22 mounted on the rear window of the car, thereby alerting the trailing vehicle driver to the deceleration of the front vehicle and therefore enabling the trailing vehicle driver to know whether the car in front of him is decelerating or preparing to apply a brake.

The deceleration signal reception displaying device 3 has a deceleration signal receiver 31 mounted on the front end of the car and a received signal display 32 installed at any place which is convenient for the driver to perceive by vision or hearing. When the deceleration signal receiver 31 receives the deceleration signal from the front car, the received signal display 32 will flash or send out warning sounds to alert the trailing driver to the deceleration of the front car.

The deceleration detecting sensor 1 can be set so that it will not work until the car travels at a speed above a predetermined value and that it can be manually switched on or off as required so as to prevent it from emitting signal or receiving deceleration signals in case of traffic jam. Further, the deceleration detecting sensor 1 may be connected with the speedometer of a car so as to be controlled by the speedometer.

The deceleration signal emitter 21 may be wholly or partially mounted on the rear end of the car for emitting signal from the rear end of the car. The horizontal range of the emitting signal must be larger than the width of a car, and the vertical range of the emitting signal and the strength of the emitting signal may be adjusted as required. The deceleration display 22 is mounted on the outer or inner side of the rear window of the car to enable it to be easily seen by the driver of the following car. The deceleration display 22 may be one or more liquid crystal displays with flashing or scrolling messages wherein the frequency of the flashing and scrolling messages is proportional to the decrease of the car speed.

The deceleration signal receiving displaying device 3 may be wholly or partially installed on the front end of a car and has a signal receiving angle which is sufficient to enclose the width of a car. Furthermore, the vertical range of the receiving signal and the capability of the receiving signal may be adjusted as required. The received signal display 32 is installed at any place which is convenient for the driver to perceive by vision or hearing. FIGS. 3, 4, 5 and 6 illustrate the working principle of the present invention.

In conclusion, the present invention has the following advantages:

1. The present invention will send out a warning to alert a trailing vehicle driver to the deceleration of the front vehicle.
2. The present invention enables the trailing vehicle driver to know whether the car in front of him is decelerating or preparing to apply a brake.
3. The present invention will send out a warning signal to alert the trailing vehicle driver to the deceleration of the front vehicle even if the visibiliy is poor.

It is still another object of the present invention to provide a vehicle deceleration communication system which can be easily installed in a car or built in a car when the car is manufactured.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A vehicle deceleration communication system comprising:

a deceleration detecting sensor mounted on a decelerating device for detecting deceleration action performed by a driver in traveling so as to send out a deceleration signal;

a deceleration signal emission displaying device activated by said deceleration signal from said deceleration detecting sensor, said deceleration signal emission displaying device comprising a deceleration signal emitter mounted at a rear end of a car and a deceleration display to alert a trailing car driver to deceleration of the car; and a deceleration signal reception displaying device comprising a deceleration signal receiver mounted at a front end of the car and a received signal display which will flash and send out warning sounds to alert the trailing driver to the deceleration of the front car;

wherein said deceleration detecting sensor is connected and mounted adjacent to an acceleration pedal or a combustion system, so that when the driver releases said acceleration pedal to slow down said car, said deceleration detecting sensor will be activated to send out a signal; said deceleration detecting sensor is mounted on a speedometer of said car and controlled by speed of said speedometer to send out deceleration signal; said deceleration detecting sensor will not work until said car travels at a speed above a predetermined value and can be manually switched on or off as required; said deceleration signal emitter is wholly or partially mounted on a rear end of said car for emitting signal from said rear end of said car, and said deceleration display is mounted on an outer or inner side of a rear window of said car to enable it to be easily seen by a trailing car driver; horizontal range of signal emitted by said deceleration signal emitter is larger than the width of a car, and vertical range and strength of said signal is adjustable as required; said deceleration display includes one or more displays with flashing or scrolling messages wherein frequency of the flashing and scrolling messages is proportional to decrease of car speed; said deceleration signal reception displaying device is wholly or partially installed on a front end of said car and installed at any place within said car which is convenient for the driver to perceive by vision or hearing; said deceleration signal receiver has a horizontal receiving range which is larger than the width of a car, and a vertical range and capability of receiving signal is adjustable as desired.

* * * * *